United States Patent [19]

Cherukuri et al.

[11] Patent Number: 4,872,884

[45] Date of Patent: Oct. 10, 1989

[54] REDUCED CALORIE CHEWING GUM BASE AND COMPOSITIONS CONTAINING THE SAME

[75] Inventors: Subraman R. Cherukuri, Towaco, N.J.; Gul Mansukhani, Staten Island, N.Y.

[73] Assignee: Warner-Lambert Company, Morris Plains, N.J.

[21] Appl. No.: 939,918

[22] Filed: Dec. 10, 1986

[51] Int. Cl.[4] ................................................ A23G 3/30
[52] U.S. Cl. .............................................. 426/3; 426/6
[58] Field of Search ................................ 426/3, 4, 5, 6

[56] References Cited

U.S. PATENT DOCUMENTS

| | | | |
|---|---|---|---|
| 4,241,091 | 12/1980 | Stroz | 426/4 |
| 4,252,830 | 2/1981 | Kehoe et al. | 426/3 |
| 4,357,354 | 11/1982 | Kehoe | 426/3 |
| 4,357,355 | 11/1982 | Koch | 426/4 |
| 4,382,963 | 5/1983 | Klose | 426/3 |
| 4,387,108 | 6/1983 | Koch et al. | 426/4 |
| 4,452,820 | 6/1984 | D'Amelia | 426/3 |
| 4,518,615 | 5/1985 | Cherukuri et al. | 426/4 |

*Primary Examiner*—Jeanette Hunter
*Attorney, Agent, or Firm*—Daniel A. Scola, Jr.

[57] ABSTRACT

A chewing gum base composition containing in weight percent about 0.5 to about 20% elastomer; about 10% to about 25% of a polyvinyl acetate having a medium molecular weight of about 35,000 to 50,000; about 4.5% to about 10.0% acetylated monoglyceride; about 6% to about 10% of a wax having a melting point below about 60° C.; and remaining amounts of material selected from the group consisting of elastomer solvent, emulsifiers, plasticizers, fillers and mixtures thereof.

34 Claims, No Drawings

REDUCED CALORIE CHEWING GUM BASE AND COMPOSITIONS CONTAINING THE SAME

The present invention relates to a chewing gum base and more particularly to chewing gum base compositions containing a low melting point wax which when used in a chewing gum composition have a reduced calorie and exhibit an enhanced hydrophilic nature.

To reduce calories in chewing gum it is often necessary to replace the soluble sugar and/or sugar alcohol bulking agents with low calorie alternatives. The soluble sugar and sugar alcohol bulking agents not only impart necessary sweetness but also a discontinuity to the gum base which results in a softer more pleasant chew and mouth feel.

Most reduced or light calorie chewing gum compositions generally contain about 25% by weight of a water insoluble gum base, inert fillers or texturizing agents in amounts of at least 40% by weight up to 90% or more, a water soluble flavoring agent and water soluble sweeteners such as sucrose and corn syrup or in sugarless gum sorbitol, mannitol and artificial sweeteners. Also incorporated within the gum base may be plasticizers or softeners to improve consistency and texture of the gum.

The gum base of reduced or light calorie chewing gum generally contains a natural rubber gum base, a synthetic rubber gum and/or mixtures thereof. When synthetic gum bases are utilized, the preferred elastomer component has been the styrene-butadiene copolymer (SBR). Gum base is noncaloric and insoluble. A chewing gum composition high in gum base content may also thus be reduced in calories.

Previous attempts to produce such high gum base content low calorie chewing gum compositions have resulted in products with a hard, tight, rubbery chew and poor texture.

Reduced calories, low calorie, and no calorie chewing gum compositions are well known. Prior attempts to produce a reduced calorie chewing gum composition have relied on high levels of inert fillers or texturizing agents to replace the sugars and sugar alcohols used as both bulking and sweetening agents in conventional chewing gums.

In U.S. Pat. No. 4,382,963, Klose, et al. disclose a sugar-free, low calorie chewing gum utilizing spray-dried polydextrose as the bulking agent. From 65% to 85% by weight polydextrose is incorporated into gum base to form a sugar-free, unsweetened, chewing gum base with a caloric density of less than one calorie per gram.

In U.S. Pat. Nos. 4,252,830 and 4,357,354 Kehoe, et al. disclose a substantially calorie-free chewable chewing gum base which includes gum base containing high levels of inert fillers, such as calcium carbonate or talc in amounts of about 50% to about 85% and about 40% to about 95% by weight respectively. The chewable gum base includes at least 10% air voids entrapped in the gum base matrix which, upon chewing, becomes filled with moisture causing asserted increase in bolus volume.

In U.S. Pat. No. 4,241,091, Stroz, et al., disclose a substantially calorie-free, non-cariogenic, non-adhesive chewing gum consisting essentially of gum base, a substantially calorie-free sweetener, from 1 to 15% by weight alpha-cellulose and from 1 to about 40% by weight water. The chewing gum of Stroz, et al., has a high bolus volume.

In published U.K. patent application No. 2,159,384A a no-calorie, noncariogenic chewing gum composition is disclosed. The chewing gum composition comprises 92% to 99% by weight of a gum base, up to 4% of glycerol and up to 3% of flavorings and was found to be substantially non-adhesive to the teeth, particularly to dental prostheses. The gum base comprises an elastomer, hydrogenated or partially hydrogenated animal or vegetable oil, mineral filler, polyvinyl acetate, fatty acid glycerides, resins, natural gum and wax in specified amounts.

While the prior art compositions have been effective to make reduced calorie chewing gums, these formulations have resulted in chewing gums having a hard chew or off taste or poor texture because of the use of high levels of fillers, and texturizing agents. It has been believed that the use of high levels of fillers and texturizers was essential to obtain a soft chew product.

It would therefore be desirable to develop a reduced calorie chewing gum that offers a reduction in caloric content without the use of high filler content.

In accordance with the present invention, a chewing gum base as well as a chewing gum composition have been discovered which have a reduced calorie content and an enhanced hydrophilic nature. This latter property enables the flavoring agent and sweetener to be released over a longer period of time during chewing without formation of a rubbery or tight chew. It appears that as the gum composition is chewed the gum base increases in size and apparently enables release of flavoring agent and sweetener which would normally be entrapped within the gum matrix while maintaining a soft chew texture. These properties are accomplished with a 30% to 50% reduction in calories in the chewing gum composition for both sugar and sugarless chewing gums.

In a preferred embodiment, the chewing gum base of this invention comprises:

(a) about 0.5 to about 20% elastomer;
(b) about 10% to about 25% of a polyvinyl acetate having a medium molecular weight of about 35,000 to 55,000;
(c) about 4.5% to about 10.0% acetylated monoglyceride;
(d) about 6% to about 10% of a wax having a melting point below about 60° C.; and
(e) remaining amounts of a material selected from the group consisting of elastomer solvent, emulsifiers, plasticizers, fillers and mixtures thereof.

In another preferred embodiment, a chewing gum composition is prepared containing a sweetening agent and from about 40% to about 75% of the chewing gum base of this invention. The chewing gum base of this invention is employed in the chewing gum compositions in higher amounts than normally used and is primarily employed as a replacement for the sweetening agent.

The reduced calorie chewing gum can be prepared in sugar or sugarless chewing gum combinations which can be made into a variety of products, e.g. stick, slab, chunk, balls, ropes, tablets and/or center filled gum products.

The present invention provides a chewing gum which is initially soft and chewable, has reduced calorie content and a desirable sweetness level. The chewing gum of the invention will have a calorie content of less than two-thirds and preferably less than 50% of that of conventional sugar containing and sugarless containing chewing gums with comparable sweetness.

As used in the specification and claims, the term "reduced calorie" shall mean having a calorie content two thirds or less that of conventional chewing gum. The term "tight" or "rubbery" chew refers to a chewing gum composition which upon chewing requires a large amount of muscular chewing effort to masticate the formulation or one that provides a difficult to deform gum bolus with high elasticity and bounce.

The elastomers useful in the present gum base composition include styrene butadiene rubber (SBR) and those non-styrene butadiene rubber (non-SBR) elastomers normally included in gum bases. Illustrative elastomers include SBR, synthetic gums or elastomers such as polyisobutylene and isobutylene-isoprene copolymers; natural gums or elastomers such as chicle, natural rubber, jelutong, balata, guttapercha, lechi caspi, sorva or mixtures thereof. Among these, polyisobutylene, isobutylene-isoprene copolymer or mixtures thereof alone or with SBR are preferred.

The elastomer content employed is in an amount of about 0.5 to about 20%, and preferably about 2.5% to about 15% by weight of the gum base. When the total amount of elastomer is below 0.5% the base composition lacks elasticity, chewing texture, and cohesiveness whereas at amounts above about 20% the formulation is hard and rubbery and maintains a tight chew.

Polyvinyl acetate (PVA) is an essential ingredient in the chewing gum base compositions of this invention. More particularly it is essential to employ a medium molecular weight variety having a mean average molecular weight of about 35,000 to about 55,000. Such material will have a preferred viscosity of 35 to 55 seconds (ASTM designation D1200-82 using a Ford cup viscometer procedure.) This medium molecular weight component is used in amounts of about 10% to about 25% by weight of the gum base and preferably from about 12% to about 17% by weight. It has also been found that the use of a blend of low molecular weight PVA and medium molecular weight PVA may be employed. Normally the low molecular weight material has a molecular weight of about 12,000 to about 16,000 mean average molecular weight. Such material will have a preferred viscosity of 14 to 16 seconds (ASTM D1200-82 using a Ford cup viscosity procedure). This low molecular weight component when used is employed in amounts up to 15% by weight of the gum base, and preferably from about 12% to about 17% by weight.

When both the low and medium molecular weight PVA components are employed they must be present in a particular mole ratio of 1:0.5 to 1.5, respectively. Lower amounts of low molecular weight component result in compositions that are tight. Higher amounts of low molecular weight component form compositions that lack elasticity.

As an optional component, it is possible to employ small amounts of high molecular weight PVA in combination with the medium molecular weight component. The high molecular weight PVA may be used in amounts of 0 to 5% by weight of the base and has a mean average molecular weight of 65,000 to 95,000. Amounts above 5% result in a tight gum chew character.

In addition to the critical PVA constituent, it has been found essential to employ acetylated monoglycerides as a plasticizing agent. While the sponification value of the acetylated monoglycerides is not critical, useable compounds include acetylated monoglycerides having sponification values of 278 to 292, 316 to 331, 370 to 380, and 430 to 470. A particularly preferred form has a sponification value above about 400. Such compounds generally have a percent acetylation above 90%, a hydroxyl value below 10 and a Reichert Meissl value above 150 (Food Chemical Codex (FCC) III/P508 and the revision of AOCS). The use of acetylated monoglyceride results in a plasticized gum base that may be formed without use of known bitter PVA plasticizers, namely triacetin. The acetylated monoglycerides of this invention are used in amounts of about 4.5% to about 10% and preferably about 5% to about 9%.

The gum base formulation must employ a wax material. The waxes have been found to soften the polymer elastomer mixture and improve elasticity of the chew character. The waxes employed must have a melting point below about 60° C. and preferably between about 45° C. and about 55° C. One particularly preferred wax is low melting point paraffin wax. Useful amounts are from about 6% to about 10% by weight and preferably from about 7% to about 9.5% by weight of the gum base composition. The use of such low melting point waxes in the gum base of this invention has been unexpectedly found not to create a tacky product which is contrary to normal belief. Waxes which have unacceptable higher melting points not useable in this invention include beeswax, vegetable waxes, candelilla wax, carnauba wax and most petroleum waxes. Such waxes however may be used in amounts up to about 5% in addition to the low melting point waxes.

In addition to the foregoing essential ingredients, the gum base compositions of this invention include a variety of traditional ingredients, such as elastomer solvent, emulsifiers, plasticizers fillers and mixtures thereof.

The gum base composition elastomer solvents aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin; terpene resins including polyterpene and polymers of alpha-pinene or beta-pinene and mixtures thereof. The elastomer solvent may be employed in an amount ranging from about 2% to about 12% and preferably about 7% to about 11% by weight of the gum base. Amounts below about 2% cause unacceptable chew characteristics. Amounts above 12% cause a soft product to be formed.

Useful optional emulsifiers in the gum base compositions of this invention include glyceryl monostearate, lecithin, fatty acid monoglycerides, diglycerides, propylene glycol monostearate and mixtures thereof. Glyceryl monostearate is most preferred. When emulsifiers are absent, the formulation has poor stability and lacks acceptable texture. It is believed that the emulsifier aids in bringing the normally immiscible constituents together in such a way that they form a single finely dispersed stable system. This emulsifier improves hydrophilic character. The emulsifier is employed in amounts of about 2% to about 10% and preferably about 4% to about 8% by weight of the base. It has been found that some emulsifiers conventionally used result in the formation of unacceptable base formulations. Non-preferred emulsifiers include glyceryl triacetate.

A variety of traditional ingredients such as plasticizers or softeners may optionally be added. Such materials are optional and not essential in the present formulation. Such materials include hydrogenated vegetable oils, lanolin, stearic acid, sodium stearate, potassium stearate, glycerine and the like and mixtures thereof. Such materials when incorporated into the gum base obtain a variety of desirable textures and consistency properties. These individual materials are generally employed in amounts of about 6% to about 20% by weight and preferably in amounts of from about 9% to about 17% by weight of the gum base composition. Because of the low molecular weight of these compounds, they are able to penetrate the fundamental structure of the base making it plastic and less viscous.

Particularly preferred plasticizers are the hydrogenated vegetable oils and include soybean oil and cottonseed oil which may be employed alone or in combination. When used in amounts of about 5% to about 14% by weight of the gum base, and preferably about 5% to about 13.5% good texture and consistent soft chew character are obtained from the chewing gum composition. Use of amounts above about 14% should not be employed since they result in separation of the gum base components during storage. Amounts below about 5% form a chewing gum product which has a tight chew.

Bulking agents such as fillers may also be employed in the gum base. Illustrative fillers include calcium carbonate, talc, aluminum hydroxide, alumina, aluminum silicates, calcium phosphates (anhydrous and dihydrate) and combinations thereof. Preferably the amount of filler when used will vary from about 15% to about 40% by weight of the gum base and most preferably 20% to 30%. Use of amounts above about 40% result in a soft product that disintegrates upon chewing whereas amounts below about 15% for a chewing gum product that is rubber or tight.

Once the gum base is prepared it is ready for blending into a chewing gum composition.

The manner in which the base constituents are blended is not critical and is performed using standard techniques and equipment known to those skilled in the art. In a typical embodiment the elastomer composition is agitated with an elastomer solvent and/or plasticizers, and/or emulsifiers for a period of about 1 minute to about 30 minutes. Once initial mixing is complete the PVA component is blended into the first mixture. While it is not essential it is preferred to add the medium molecular weight PVA prior to addition of the optional low molecular weight component. In this manner uniform blending can be achieved without the creation of isolated pockets of PVA within the elastomer. The remaining base constituents may now be added in bulk, incrementally or stepwise while the resulting mixture is blended for a further equivalent period of time.

The present gum base may be formulated into a variety of chewing gum products utilizing standard procedures and equipment. A chewing gum composition may be prepared by combining conventional ingredients such as sweeteners, flavors, colorants and the like.

The amount of gum base employed will vary depending on such factors as the type of base used, consistency desired and other components used to make the final product. In general, amounts from about 40% to 75% by weight of the final composition are acceptable with preferred amounts of about 50% to about 65% by weight being useable.

As indicated above, the gum base composition may be used in sugar and sugarless containing chewing gums to prepare a reduced calorie containing product. In addition, the chewing gum may be anhydrous, substantially anhydrous or prepared to be moisture containing.

The unique combination of components used to prepare the gum base of this invention enables the gum base to be employed at higher than normal levels to achieve a reduced calorie product by concurrent reduction in the amount of sweetener employed. It is well known that the calories and cariogenic properties of chewing gums are primarily contributed by the sweetening agents, both sugar and sugarless. By preparing a gum base which does not need high levels of sweetener to plasticize the base and render it soft during chewing it is possible to employ higher levels of the noncaloric base in place of the sweetening agent. This increase can be achieved without the need for increasing filler content to that which would be normally present and thus avoids the formation of rubbery or tight chew, products.

The sweetening agent used in the chewing gum compositions may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides, and polysaccharides such as xylose, ribose, glucose, mannose, galactose, fructose, dextrose, sucrose, sugar, maltose, partially hydrolyzed starch, or corn syrup solids and sugar alcohols such as sorbitol, xylitol, mannitol and mixtures thereof.

B. Water-soluble artificial sweeteners such as the soluble saccharin salts, i.e., sodium or calcium saccharin salts, cyclamate salts, acesulfame-K and the like, and the free acid form of saccharin.

C. Dipeptide based sweeteners such as L-aspartyl-L-phenylalanine methyl ester and materials described in U.S. Pat. No. 3,492,131 and the like.

In general, the amount of sweetener will vary with the desired amount of sweeteners selected for a particular chewing gum. This amount will normally be 0.001% to about 60% by weight when using an easily extractable sweetener. The water-soluble sweeteners described in category A above, are preferably used in amounts of about 25% to about 60% by weight. In contrast, the artificial sweetener described in categories B and C are used in amounts of about 0.005% to about 5.0% and most preferably about 0.05% to about 2.5% by weight of the final gum composition. These amounts are ordinarily necessary to achieve a desired level of sweetness independent from the flavor level achieved from flavor oils.

Flavoring agents well known to the chewing gum art may be added to the chewing gum compositions of the instant invention. These flavoring agents may be chosen from synthetic flavoring liquids and/or oils derived from plants leaves, flowers, fruits and so forth, and combinations thereof. Representative flavoring liquids include: spearmint oil, cinnamon oil, oil of wintergreen (methylsalicylate) and peppermint oils. Also useful are artificial, natural or synthetic fruit flavors such as citrus oil including lemon, orange, grape, lime and grapefruit and fruit essences including apple, strawberry, cherry, pineapple and so forth.

The amount of flavoring agent employed is normally a matter of preference subject to such factors as flavor type, base type and strength desired. In general, amounts of about 0.05% to about 2.0% by weight of the final chewing gum composition are usable with amounts of about 0.8% to about 1.5% being preferred.

The chewing gum formulations are prepared by conventional methods. An illustrative process involves first melting the gum base at a temperature from about 70° C. to about 120° C. and mixing the gum base in a kettle with a liquid softener and/or a emulsifier for 2 to 8 minutes. To this mixture ⅜ to ¾ of the sweetener ingredient and colors are added and mixing is continued for 1 to 4 minutes. To this mixture the remaining sweetener ingredients are added and while mixing is continued, the flavoring agent is slowly added. Mixing is maintained for 1 to 4 minutes. To this mixture a humectant can be added and mixing is continued for 1 to 4 minutes. The gum is discharged from the kettle and formed into its desired shape such as strips, slabs, chunks, ball ropes and/or center filled.

The chewing gum composition of this invention may additionally include the conventional additives of coloring agents such as titanium dioxide; emulsifiers such as lecithin and glyceryl monostearate; and fillers such as dicalcium phosphate, aluminum hydroxide, alumina, aluminum silicates, talc, calcium carbonate, and combinations thereof. The total amount of fillers present is generally up to about 10% by weight.

The following examples are given to illustrate the invention, but are not deemed to be limiting thereof. All percentages given throughout the specification are based upon weight unless otherwise indicated, percentages of base components are by weight of the base, whereas chewing gum composition components are by weight of the final chewing gum formulation.

EXAMPLE 1

Inventive Runs I to VI

Comparative Runs A to G

This example demonstrates the formation of chewing gum bases according to the invention.

To a preheated kettle is added the elastomer which is mixed for 3 minutes under high shear until the mass reaches a temperature of 88° C. To this mass is added an elastomer solvent and mixing continued for 5 minutes. To this first mixture is added in sequence while mixing is continued the medium molecular weight PVA, low molecular weight PVA when used, waxes, plasticizer and acetylated monoglyceride. The final mass is blended for about 30 minutes. The final temperature should range from 71° C. to 99° C. The molten mass is discharged from the kettle and put into coated pans. The base is allowed to cool and harden before depanning. The ingredients are recited in Table I represent inventive formulations whereas in Table II the comparative formulations are provided.

TABLE I

| Ingredient | INVENTIVE RUNS (amounts in %) | | | | | |
| --- | --- | --- | --- | --- | --- | --- |
| | I | II | III | IV | V | VI |
| Polyisobutylene elastomer | 10.0 | 10.0 | 12.0 | 10.0 | 10.0 | 10.0 |
| Polyvinylacetate | | | | | | |
| low molecular weight | 15.0 | 15.0 | 15.0 | 15.0 | 15.0 | 12.0 |
| medium molecular weight | 15.0 | 15.0 | 15.0 | 15.0 | 15.0 | 12.0 |
| Glyceryl ester of partially hydrogenated wood resin | 5.0 | 5.0 | 5.0 | 7.5 | 5.0 | 8.0 |
| Hydrogenated vegetable oil | | | | | | |
| (a) cotton seed oil | — | 9.0 | 9.0 | 13.5 | — | — |
| (b) partially hydrogenated soybean oil | 9.0 | — | — | — | 9.0 | 9.0 |
| Emulsifier (glyceryl monostearate) | 6.0 | 6.0 | 6.0 | 8.0 | 8.0 | 8.0 |
| Filler | 26.0 | 26.0 | 24.0 | 17.0 | 22.5 | 25.5 |
| Acetylated monoglyceride | 5.0 | 5.0 | 5.0 | 5.0 | 6.5 | 6.5 |
| Wax (Paraffin Wax) MP 48 C-52 C | 9.0 | 9.0 | 9.0 | 9.0 | 9.0 | 9.0 |
| | 100.0 | 100.0 | 100.0 | 100.0 | 100.0 | 100.0 |

TABLE II

| Ingredient | Comparative Runs (amounts in %) | | | | | | |
| --- | --- | --- | --- | --- | --- | --- | --- |
| | A | B | C | D | E | F | G |
| Polyisobutylene | 14.0 | 14.0 | 10.0 | 10.0 | 10.0 | 10.0 | 10.0 |
| Polyvinylacetate | | | | | | | |
| Low molecular weight | — | 39.0 | 20.0 | 17.0 | 12.0 | 12.0 | 12.0 |
| Medium molecular wight | 39.0 | — | 10.0 | 17.0 | 12.0 | 12.0 | 12.0 |
| Glyceryl ester of partially hydrogenated wood resin | 11.0 | 6.0 | 5.0 | 12.0 | 8.0 | 8.0 | 8.0 |
| Hydrogenated vegetable oil | | | | | | | |
| cotton seed oil | 13.0 | 13.0 | 9.0 | — | — | — | — |
| partially hydrogenated soybean oil | — | — | — | 13.5 | 9.0 | 9.0 | 18.0 |
| Emulsifier (glyceryl monostearate) | 8.0 | 8.0 | 8.0 | 8.0 | 8.0 | 18.0 | |
| Filler | — | — | 24.0 | — | 25.5 | 25.5 | 25.5 |
| Plasticizer | | | | | | | |
| glycerol triacetate | — | 4.0 | — | 2.5 | — | — | — |
| acetylated monoglyceride | 4.0 | — | 5.0 | 8.0 | 6.5 | 6.5 | 6.5 |
| Wax | | | | | | | |
| (a) Microcrystalline Wax | — | — | — | — | — | 9.0 | — |
| (b) Paraffin (MP above 77 C) | — | — | — | — | 9.0 | — | — |
| (c) Paraffin (MP between 48 C-52 C | 11.0 | 16.0 | 9.0 | 12.0 | — | — | — |
| | 100.0 | 101.0 | 100.0 | 100.0 | 100.0 | 100.0 | 100.0 |

EXAMPLE 2

INVENTIVE RUNS VII TO XII

COMPARATIVE RUNS H TO N

This example demonstrates the formation of chewing gum compositions according to this invention using the base formulations of Example 1.

Chewing gum formulations are prepared with the ingredients recited in Tables 1 and II. The formulations were prepared by first melting the gum base at a temperature from 70° C. to 100° C. and mixing the gum base in a kettle with the emulsifier and corn syrup. Mixing is continued for approximately 2 minutes to obtain a homogenous mixture. To this mixture is added the remaining ingredients of Table III and mixing continued for approximately 7 minutes.

The gum is discharged from the kettle and formed into chunks and conditioned to room temperature (24° C.)

In order to evaluate the chewing gum formulations, the formulations were subjected to chew out test panel studies using multiple panelists. The results demonstrated that the chewing gum formulations of this invention exhibited consistent soft chew character and slow flavor release whereas the comparative samples were either too soft or resulted in a rubbery/tight chew character. Based on a scale of 0 to 100 with 0 being poor and 100 being excellent each product was rated over a 10 minute chew test with overall results set forth below. Inventive formulation XII was modified in comparative runs L, M and N such that different wax materials were used having high melting points, that is melting points above the preferred 60° C. The results indicate that by merely changing the wax component an unacceptable chewing gum formulation is obtained. The specific results were:

| | |
|---|---|
| Inventive Run VII (using Run I) | slightly soft and slightly rubbery caused by high PVA content (50 overall rating) |
| Inventive Run VIII (using Run II) | slightly soft and slightly rubbery caused by higher PVA content (50 overall rating) |
| Inventive Run IX (using Run III) | Light chew and lightly rubbery caused by higher PVA content (75 overall rating) |
| Inventive Run X (using Run IV) | soft chew and slightly rubbery caused by higher PVA content (70 overall rating) |
| Inventive Run XI (using Run V) | soft chew and slightly rubbery caused by higher PVA content (60 overall rating) |
| Inventive Run XII (using Run VI) | very good soft chew and does not become tight (85 overall rating) |
| Comparative Run H (using Run A) | very firm/tight chew (40 overall rating) |
| Comparative Run I (using Run B) | Very firm/tight chew (35 overall rating) |
| Comparative Run J (using Run C) | Soft/sloppy chew (35 overall rating) |
| Comparative Run K (using Run D) | Base separated because of high wax and oil content (40 overall rating) |
| Comparative Run L (using Run E) | Very firm chew and fails to release flavor (45 overall rating) |
| Comparative Run M (using run F) | Chew became very firm over time and failed to release flavor (40 overall rating) |
| Comparative Run N (using run G) | Firm and loose chew (35 overall rating) |

TABLE III

| Ingredients | Amounts (% by Weight) |
|---|---|
| Gum Base | 70.59% |
| Sugar, granulated | 16.91 |
| Corn Syrup (44° Be) | 10.00 |
| Emulsifier | 0.2 |
| Flavor | 2.3 |
| | 100.00 |

EXAMPLE 3

INVENTIVE RUNS XIII AND IXX

COMPARATIVE RUNS O, P AND Q

This example demonstrates the formation of chewing gum compositions according to the procedure of Example 1 using the formulations recited in Table IV. The caloric content of the chewing gums produced are recited in the table. The formulations used in Runs IXX and P were anhydrous compositions. The inventive formulations all exhibited a soft firm chew character and did not revert to a rubber/tight chew when the product was subject to a chew out study by an expert panel according to Example II. The panel found that the inventive formulations lacked initial high flavor release but over a chew out period of up to 30 minutes that flavor release continued to increase to fully acceptable levels and was consistently maintained. In addition gum bolus size was noted to increase slightly yet the gum maintained its texture throughout the test. In contrast the comparative formulations lost almost half of their flavor level within 2 minutes and continued to drop thereafter. In addition the chew character went from soft/firm to firm/tight for comparative O, from soft/firm to very soft for comparative P and remained the same for comparative Q.

TABLE IV

| | Comparative/Inventive (amounts in %) | | | Comparative/Inventive (amounts in %) | |
|---|---|---|---|---|---|
| Ingredients | O | P | XII | Q | IXX |
| Gum Base Blend | 21.0 | 21.0 | 70.59 | 19.0 | 70.59 |
| (a) Gum Base | 21.0 | 21.0 | 60 | 19.0 | 60.0 |
| (b) Glyceryl Monostearate | — | — | 3.53 | — | 3.53 |
| (c) Fat | — | — | 7.06 | — | 7.06 |
| | (commerical) | (Example VI) | (Example VI) | (Commercial) | (Example VI) |
| Sweetener | | | | | |
| Sugar, granulated | 54.0 | 54.0 | 16.91 | 56.0 | 18.71 |
| Sugar, Baker's special | — | — | — | 15 | — |
| Corn Syrup (44 Be) | 16.5 | 16.5 | 10.00 | — | — |
| Filler | 6.0 | 6.0 | — | — | — |
| Maltodextrin | — | — | — | 4.0 | 4.0 |
| Flavor | 1.35 | 1.35 | 2.3 | 1.5 | 2.2 |

TABLE IV-continued

| Ingredients | Comparative/Inventive (amounts in %) | | | Comparative/Inventive (amounts in %) | |
|---|---|---|---|---|---|
| | O | P | XII | Q | IXX |
| Emulsifier | 0.2 | 0.2 | 0.2 | 0.5 | 0.5 |
| Glycerin | 0.45 | 0.45 | — | 4.0 | 4.0 |
| Color | 0.5 | 0.5 | — | — | — |
| | 100.00 | 100.00 | 100.00 | 100.00 | 100.00 |
| Calories/gram | 2.86 | 2.86 | 1.12 | 3.21 | 1.12 |

The invention being thus described, it will be obvious that the same may be varied in many ways. Such variations are not to be regarded as a departure from the spirit and scope of the invention and all such modifications are intended to be included within the scope of the following claims.

We claim:

1. A chewing gum base composition consisting essentially of, in weight percent:
   (a) about 0.5 to about 20% elastomer; about 10% to about 25% of a polyvinyl acetate having a medium molecular weight of about 35,000 to about 55,000; about 4.5% to about 10.0% acetylated monoglyceride; and about 6% to about 10% of a wax having a melting point below about 60° C.; and
   (b) remaining amounts of a material selected from the group consisting of elastomer solvent, emulsifiers, plasticizers, fillers and mixtures thereof.

2. The composition of claim 1 wherein the elastomer is selected from the group consisting of synthetic gums, natural gums, synthetic elastomers, natural elastomers and mixtures thereof.

3. The composition of claim 1 wherein the elastomer is present in an amount of about 2.5% to about 15%.

4. The composition of claim 1 wherein the polyvinylacetate is present in an amount of about 12% to about 17%.

5. The composition of claim 1 wherein the composition additionally contains up to about 15% of a polyvinyl acetate having a low molecular weight of about 12,000 to about 16,000.

6. The composition of claim 5 wherein the low molecular weight polyvinylacetate is present in an amount of about 12% to about 17%.

7. The composition of claim 5 wherein the mole ratio of low molecular weight polyvinyl acetate to the medium molecular weight polyvinyl acetate is 1:0.5–1.5.

8. The composition of claim 1 wherein the acetylated monoglyceride has a sponification value above about 400.

9. The composition of claim 8 wherein the acetylated monoglyceride is present in an amount of about 5% to about 9%.

10. The composition of claim 1 wherein the plasticizer is a hydrogenated vegetable oil selected from the group consisting of soybean oil, cotton seed oil and mixtures thereof.

11. The composition of claim 10 wherein the hydrogenated vegetable oil is present in an amount of about 5% to about 13%.

12. The composition of claim 1 wherein the filler is present in an amount of about 15% to about 40%.

13. The composition of claim 1 wherein the wax is a paraffin wax having a melting point between about 45° C. and 55° C.

14. The composition of claim 1 wherein the elastomer solvent is present in the amount of about 2% to about 12% and wherein the elastomer solvent is selected from the group consisting of pentaerythritol ester of partially hydrogenated wood resin, glycerol ester of partially dimerized rosin, glycerol ester of polymerized rosin, glycerol ester of tall oil rosin, glycerol ester of wood resin and partially hydrogenated wood resin and partially hydrogenated methyl ester of rosin; terpene resins including polyterpene and polymers of alpha-pinene or beta-pinene and mixtures thereof.

15. The composition of claim 14 wherein the elastomer solvent is present in an amount of about 7% to about 11%.

16. A chewing gum base composition consisting essentially of, in weight percent:
   (a) about 0.5% to about 20% elastomer;
   (b) about 2% to about 11% elastomer solvent;
   (c) about 10% to about 25% of a polyvinyl acetate having a medium molecular weight of about 35,000 to 55,000;
   (d) about 4.5% to about 10.0% acetylated monoglyceride;
   (e) about 5% to about 14% plasticizer;
   (f) about 15% to about 40% filler and
   (g) about 6% to about 10% of a wax having a melting point below about 60° C.

17. A reduced calorie chewing gum composition having an enhanced hydrophilic nature when chewed, which comprises: a sweetening agent and about 40% to about 75% of a chewing gum base consisting essentially of, in weight percent:
   (a) about 0.5% to about 20% elastomer;
   (b) about 10% to about 25% of a polyvinyl acetate having a medium molecular weight of about 35,000 to 55,000;
   (c) about 4.5% to about 10.0% acetylated monoglyceride;
   (d) about 6% to about 10% of wax having a melting point below about 60° C.; and
   (e) remaining amounts of a material selected from the group consisting of elastomer solvent, emulsifiers, plasticizers, fillers and mixtures thereof.

18. The composition of claim 17 wherein the elastomer is selected from the group consisting of synthetic gums, natural gums, synthetic elastomers, natural elastomers and mixtures thereof.

19. The composition of claim 17 wherein the elastomer is present in an amount of about 2.5% to about 15%.

20. The composition of claim 17 wherein the polyvinylacetate is present in an amount of about 12% to about 17%.

21. The composition of claim 17 wherein the composition additionally contains up to about 15% of a polyvinyl acetate having a low molecular weight of about 12,000 to about 16,000.

22. The composition of claim 21 wherein the low molecular weight polyvinylacetate is present in an amount of about 12% to about 17%.

23. The composition of claim 21 wherein the mole ratio of low molecular weight polyvinyl acetate to the medium molecular weight polyvinyl acetate is 1:0.5–1.5.

24. The composition of claim 17 wherein the acetylated monoglyceride has a sponification value above about 400.

25. The composition of claim 24 wherein the acetylated monoglyceride is present in an amount of about 5% to about 9.0%.

26. The composition of claim 17 wherein the plasticizer is a hydrogenated vegetable oil selected from the group consisting of soybean oil, cotton seed oil and mixtures thereof.

27. The composition of claim 26 wherein the hydrogenated vegetable oil is present in an amount of about 5% to about 13.5%.

28. The composition of claim 17 wherein the filler is present in an amount of about 15% to about 40%.

29. The composition of claim 17 wherein the wax is a paraffin wax having a melting point between about 45° C. and 55° C.

30. The composition of claim 17 wherein the elastomer solvent is present in the amount of about 2% to about 12% and wherein the elastomer solvent is selected from the group consisting of pentaerythritol ester of partially hydrogenated wood resin, glycerol ester of partially dimerized rosin, glycerol ester of polymerized rosin, glycerol ester of tall oil rosin, glycerol ester of wood resin and partially hydrogenated wood resin and partially hydrogenated methyl ester of rosin; terpene resins including polyterpene and polymers of alpha-pinene or beta-pinene and mixtures thereof.

31. The composition of claim 30 wherein the elastomer solvent is present in an amount of about 7% to about 11%.

32. The chewing composition of claim 17 wherein the sweetening agent is selected from the group consisting of water-soluble sweetening agents, water-soluble artificial sweeteners, dipeptide based sweeteners and mixtures thereof.

33. The chewing gum composition of claim 17 which additionally contains a flavoring agent.

34. The chewing gum composition of claim 33 wherein the flavoring agent is selected from the group consisting of peppermint oil, spearmint oil, cinnamon oil, oil of wintergreen, fruit flavors and mixtures thereof.

* * * * *